United States Patent
Campos

(10) Patent No.: US 10,940,785 B2
(45) Date of Patent: Mar. 9, 2021

(54) VEHICLE HOLDING UNIT

(71) Applicant: Nissan North America, Inc., Franklin, TN (US)

(72) Inventor: Oliver Ruben Acosta Campos, Metepec (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/051,134

(22) Filed: Jul. 31, 2018

(65) Prior Publication Data

US 2020/0039412 A1 Feb. 6, 2020

(51) Int. Cl.
*B60N 3/10* (2006.01)
*B60R 11/02* (2006.01)
*B60R 11/00* (2006.01)

(52) U.S. Cl.
CPC ............ *B60N 3/107* (2013.01); *B60N 3/102* (2013.01); *B60R 11/0241* (2013.01); *B60N 3/106* (2013.01); *B60N 3/108* (2013.01); *B60R 2011/0075* (2013.01)

(58) Field of Classification Search
USPC ........................ 248/311.2; 224/926, 282, 281
See application file for complete search history.

(56) References Cited

U.S. PATENT DOCUMENTS

| | | | | |
|---|---|---|---|---|
| 5,342,009 A | * | 8/1994 | Lehner | A47G 23/0225 |
| | | | | 248/284.1 |
| 5,423,508 A | * | 6/1995 | Isenga | B60N 3/102 |
| | | | | 224/407 |
| 5,697,593 A | * | 12/1997 | Bieck | B60N 3/102 |
| | | | | 248/311.2 |
| 6,431,391 B1 | * | 8/2002 | Kaupp | B60N 3/102 |
| | | | | 220/737 |
| 7,597,300 B2 | | 10/2009 | Harada | |
| 2006/0027722 A1 | * | 2/2006 | Hoshi | B60N 3/105 |
| | | | | 248/311.2 |
| 2006/0060741 A1 | * | 3/2006 | Yanagita | B60N 3/102 |
| | | | | 248/311.2 |

* cited by examiner

Primary Examiner — Alfred J Wujciak
(74) Attorney, Agent, or Firm — Global IP Counselors, LLP

(57) ABSTRACT

A vehicle holding unit includes a cupholder and a holding member. The cupholder has a sidewall defining a cup receiving area. The holding member having a base movable between a stowed position and a deployed position. The base being mainly vertical in the stowed position. The base being mainly horizontal and extends into the cup receiving area in the deployed position.

19 Claims, 6 Drawing Sheets

VEHICLE HOLDING UNIT

BACKGROUND

FIELD OF THE INVENTION

The present invention generally relates to a vehicle holding unit. More specifically, the present invention relates to a vehicle holding unit that can be integrated as an interior accessory for a vehicle.

BACKGROUND INFORMATION

Generally, vehicles are equipped with cup holders as a means by which beverage containers, e.g. beverage can, cup, bottle, can be held in place while the vehicle is in motion or otherwise. A cupholder is commonly attached to a console within the vehicle, the back side of a seat, or a predetermined location that is accessible to the vehicle's occupants. The structure of a cup holder typically includes a hole or cavity in which a beverage container can be inserted.

SUMMARY

It has been discovered that passengers utilize vehicle cupholders to store personal objects other than beverage containers.

In view of the state of the known technology, one aspect of the present disclosure is to provide a vehicle holding unit having a cupholder and a holding member. The cupholder has a sideman defining a cup receiving area. The holding member having a base movable between a stowed position and a deployed position. The base being mainly vertical in the stowed position. The base being mainly horizontal and extends into the cup receiving area in the deployed position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
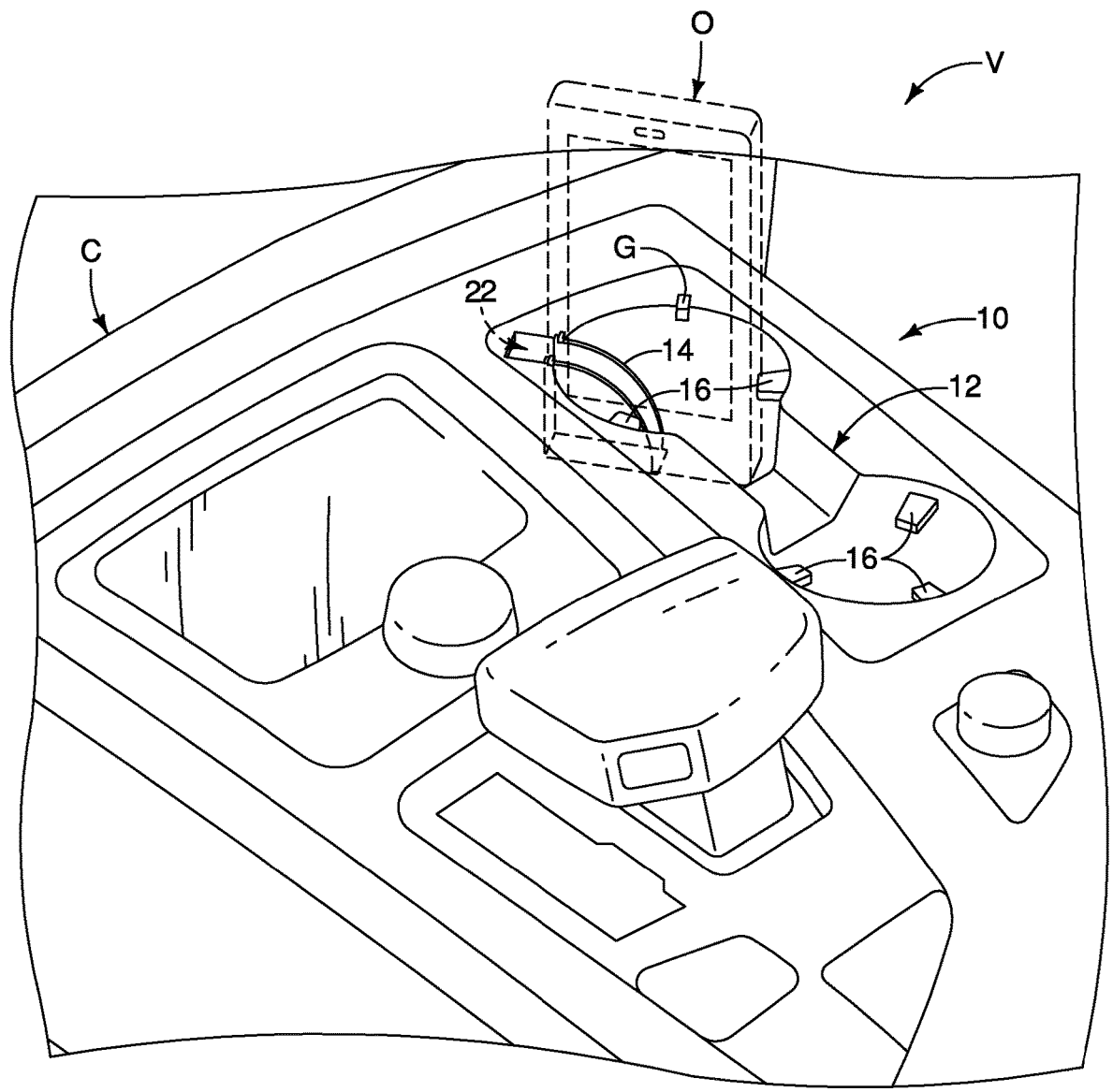
FIG. 1 is a perspective view of a portion of a center console equipped with a vehicle holding unit of the illustrated embodiment.

Referring now to FIG. 1, a vehicle holding unit 10 is illustrated within a vehicle interior V in accordance with a first illustrated embodiment. In particular, the vehicle holding unit 10 is illustrated as being provided in a center console C of a passenger compartment. The vehicle holding unit 10 of the illustrated embodiment is considered a vehicle interior V accessory that is provided to the center console C. It will be apparent to those skilled in the vehicle field from this disclosure that the vehicle holding unit 10 can alternatively be provided in other locations, such as the back side of a seat, or another predetermined location that is accessible to the vehicle's occupants.

In the illustrated embodiment, the vehicle holding unit 10 is provided to contain an external object O or objects in addition to holding a cup or a beverage container. For example, the external object O can be a mobile device, passport or wallet. The vehicle holding unit 10 is configured such that the external object O can be snugly inserted into the vehicle holding unit 10 and can be readily accessible by the passenger or a driver as needed and/or necessary. Thus, as seen in FIGS. 2 and 3, the vehicle holding unit 10 comprises a cupholder 12 and a holding member 14.

Figure 4:
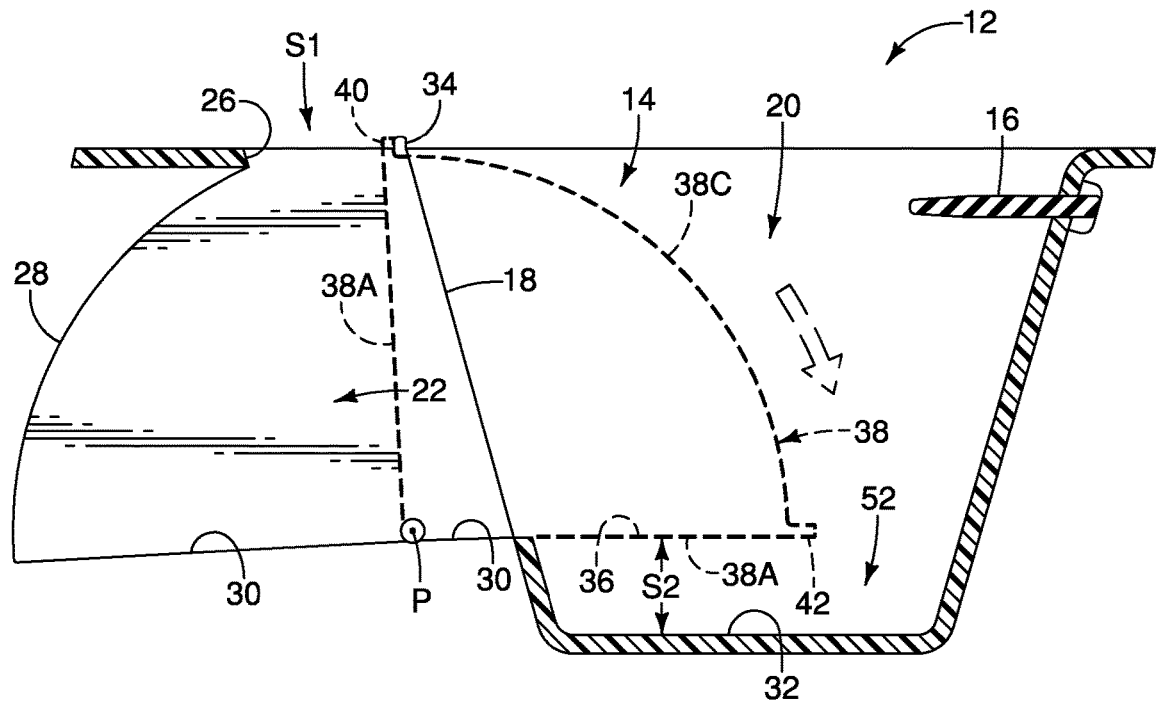
FIG. 4 is a cross-sectional view taken along lines 3-3 of FIG. 2 with the holding member in a deployed position.

The holding member 14 is movable between a stowed position and a deployed position. The holding member 14 is configured to hold the external object O in the deployed position, as seen in FIGS. 1 and 4. As best seen in FIG. 2, the vehicle holding unit 10 further comprises a plurality of retention arms 16. At least one of the retention arms 16 is disposed substantially across from the holding member 14. As all of the retention arms 16 are identical, the retention arm 16 that will be referenced in this disclosure will refer to the retention arm 16 disposed across from the holding member 14. Preferably, the vehicle holding unit 10 is designed such that the external object O is held in place by the holding member 14 and the retention arm 16. In other words, the holding member 14 is provided such that the external object O is snugly held in the vehicle holding unit 10 by the holding unit and the retention arm 16.

Figure 2:
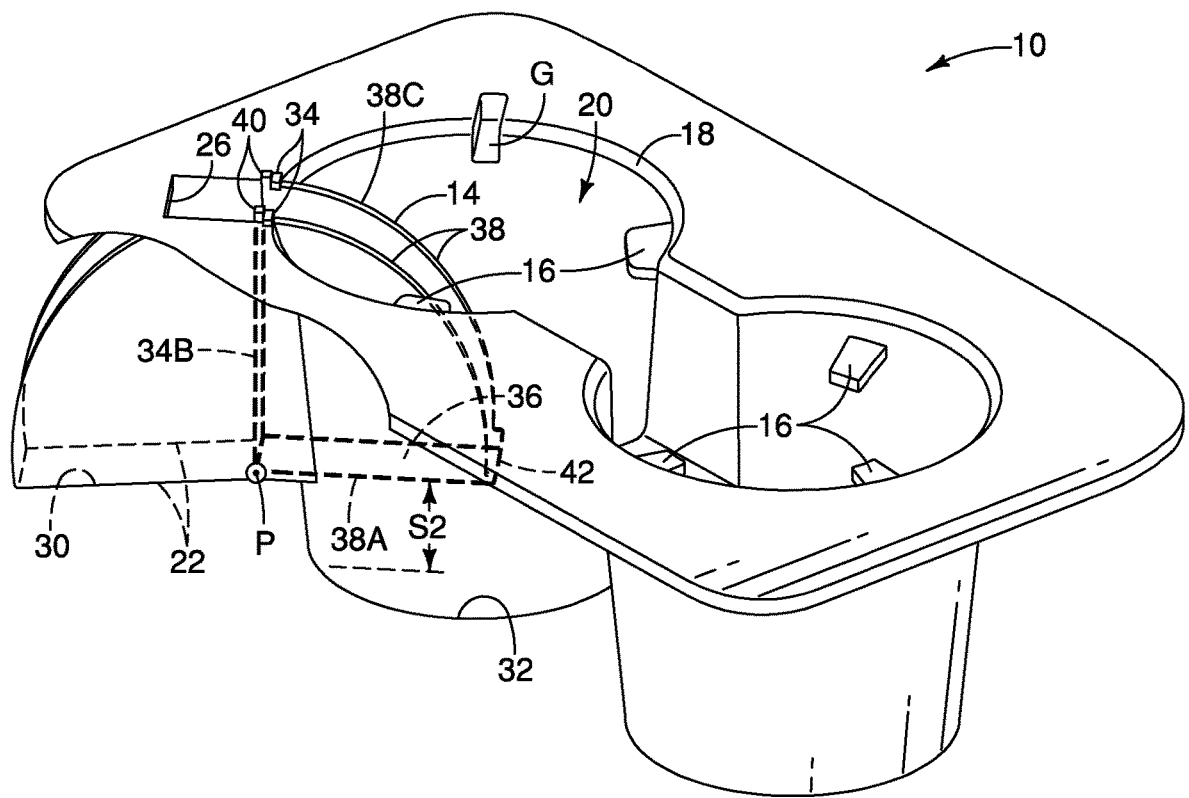
FIG. 2 is an upper perspective unit of the vehicle holding unit having a cupholder and a holding member.
Figure 3:
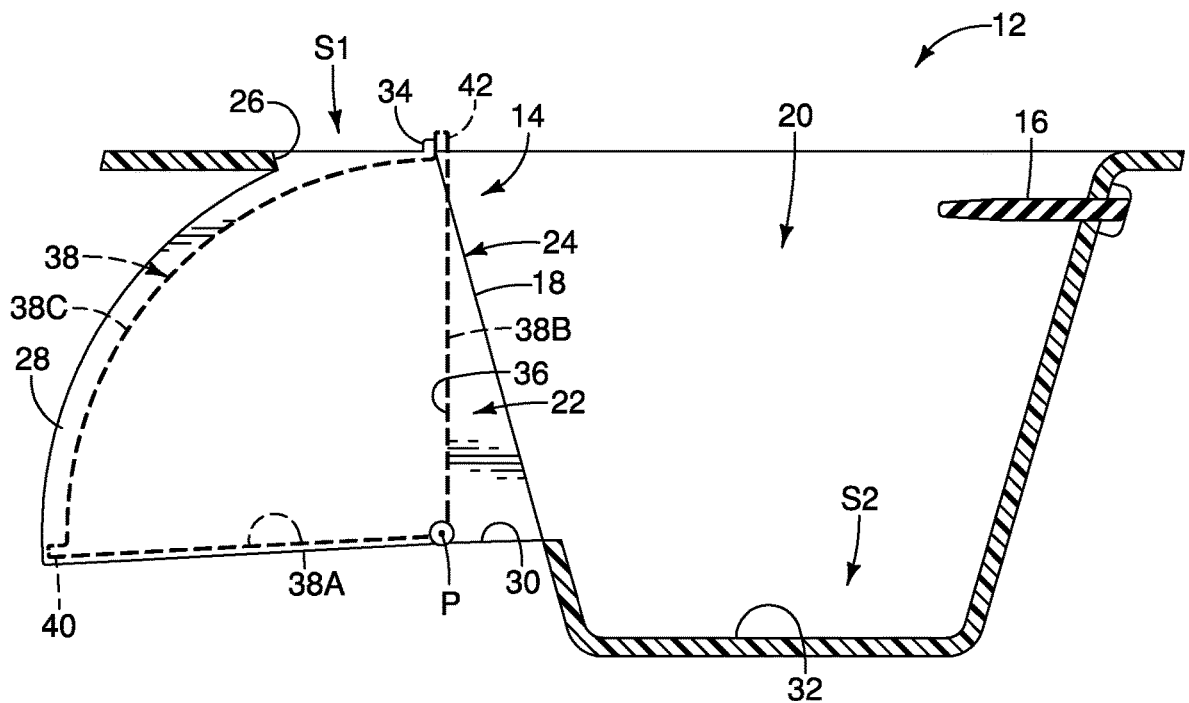
FIG. 3 is a cross-sectional view taken along lines 3-3 of FIG. 2 with the holding member in a stowed position.

Referring to FIGS. 2 to 4, the cupholder 12 has a sidewall 18 defining a cup receiving area 20. In the illustrated embodiment, the cupholder 12 includes a pair of cup receiving areas 20 that are in open communication. As shown, the retention arm 16 is provided along the sidewall 18 of the cupholder 12. Preferably, the retention area 16 is a spring-loaded projection that is biased to extend into the cup receiving area 20. It will be apparent to those skilled in the vehicle field from this disclosure that the vehicle holding unit 10 can include additional sidewalls separating cup receiving areas. It will be further apparent to those skilled in the vehicle field that the vehicle holding unit 10 can include additional cup receiving areas as needed and/or desired. For simplicity, the present disclosure will discuss the cup receiving area 20 having the holding member 14 only.

As best seen in FIGS. 2 to 4, the cupholder 12 includes a recess 22 in communication with the cup receiving area 20. In particular, the recess 22 has an elongated side opening 24 that leads to the cup receiving area 20. The side opening 24 is located directly across from the recess 22 retention arm 16. In other words, the recess 22 is located directly across from the retention arm 16. As best seen in FIG. 2, the cupholder 12 preferably further includes a receiving groove G that can he utilized for receiving wires of the external object O (e.g., wires of a mobile device) in an interference fit. The receiving groove G can be an embossed area of the sidewall 18.

The holding member 14 is disposed substantially in the recess 22 when in the stowed position, as seen in FIG. 3. The external object O is held in place by the recess 22, the holding member 14 and the retention arm 16 when the holding member 14 is in the deployed position. In the stowed position, the holding member 14 is spaced from an end wall 26 of the recess 22. Therefore, the holding member 14 is separated from the end wall 26 by a space S1 to enable user access of the holding member 14 into the space S1. The space S1 is sized and dimensioned for a user's finger to access the holding member 14 to move the holding member 14 between the stowed and deployed positions.

The recess 22 further includes a pair of sidewalls 28 connected by a bottom surface 30 of the recess 22. Preferably, in the illustrated embodiment, as best seen in FIG. 4, the bottom surface 30 of the recess 22 is separated from a bottom 32 of the cupholder 12 by a space 52 to store small items as needed and/or desired (e.g., wires, charging devices for mobile devices). As best seen in FIG. 2, each of the sidewalls 28 of the recess 22 leads to an abutment 34. Thus, the recess 22 includes a pair of abutments 34. Each of the abutments 34 are disposed between the sidewalls 28 of the recess 22 and the sidewall 18 of the cupholder 12. The abutments 34 are configured to contact the holding member 14 to stop the holding member 14 when the holding member 14 is moved between the stowed position and the deployed position.

The holding member 14 will now be discussed. The holding member 14 and the recess 22 are movably connected. In the illustrated embodiment, the holding member 14 and the recess 22 are pivotally connected in a conventional manner. The vehicle holding unit 10 includes a pivot pin pivotally connecting the holding member 14 to the recess 22. Thus, the holding member 14 is pivotally coupled to the recess 22 by the pivot pin, which defines a pivot point P of the holding member 14. The pivotal connection between the holding member 14 and the recess 22 is conventional. For example, the pivot pin can be disposed through the sidewalls 28 of the recess 22 to connect the holding member 14. Alternatively, the bottom surface 30 of the recess 22 can include a receiving hole (not shown) that receives the pivot pin. It will be apparent to those skilled in the vehicle filed from this disclosure that the holding member 14 and the recess 22 can be movably connected by other means as needed and/or desired. For example, the holding member 14 can be slidably connected to the recess 22, as will be further discussed below.

In the illustrated embodiment, the holding member 14 is a rigid member preferably made of metal or plastic. The holding member 14 includes a base 36 and a pair of side supports 38. The side supports 38 are slidable with respect to the recess 22. The side supports 38 are coupled to opposite sides of the base 36 to define a pocket for holding the external object O. The side supports 38, the base 36 and the end wall 26 of the recess 22 define the pocket when the base 36 is in the deployed position. In the illustrated embodiment, the base 36 is integrally connected to each of the side supports 38. Preferably, the side supports 38 and the base 36 are a one-piece unitary member. However, it will be apparent to those skilled in the vehicle field from this disclosure that the base 36 and the side supports 38 can be separate pieces that are removably or fixedly attached to each other as needed and/or desired.

As the side supports 38 are identical, only one of the side supports 38 will be discussed for simplicity. In the illustrated embodiment, the side support 38 is wedge-shaped having first and second straight edges 38A and 38B and a curved edge 38C. The side support 38 is attached to the base 36 at the first straight edge 36A. The side support 38 includes a projection 40 at a point where the second straight edge 38B and the curved edge meet 38C. The projection 40 is configured to contact one of the abutments 34 of the sidewall 18 of the cupholder 12. In particular, the abutment 34 contacts one of the abutments 34 when the holding member 14 is in the deployed position, as seen in FIG. 4. At least one of the side supports 38 includes the projection 40 that abuts the sidewall 18 of the cupholder 12 when the holding member 14 is in the deployed position.

As seen in FIG. 1, the external object O rests on the base 36 when the holding member 14 is in the deployed position. In the illustrated embodiment, the deployed and stowed positions of the holding member 14 can be considered to constitute positions of the base 36. Thus, the base 36 is movable between the stowed position and the deployed position. As best seen in FIG. 2, the retention arm 16 extends from the sidewall 18 substantially across from the base 36 in the deployed position.

As seen in FIG. 3, the base 36 is vertical in the stowed position. The base 36 is mainly horizontal and extends into the cup receiving area 20 in the deployed position, as seen in FIG. 4. As a result, the base 36 is cantilevered with respect to the cupholder 12 in the deployed position. In the illustrated embodiment, the base 36 moves as the holding member 14 is pivoted at the pivot point P. The base 36 moves circumferentially with respect to the pivot point P. Thus, the base 36 is not radially movable when moving between the stowed and deployed positions. The base 36 has a user contact portion 42 that protrudes from the side supports 38. The user contact portion 42 is configured to contact the abutment 34 of the cupholder 12 when the base 36 is in the stowed position, as seen in FIGS. 2 to 4.

Figure 5:
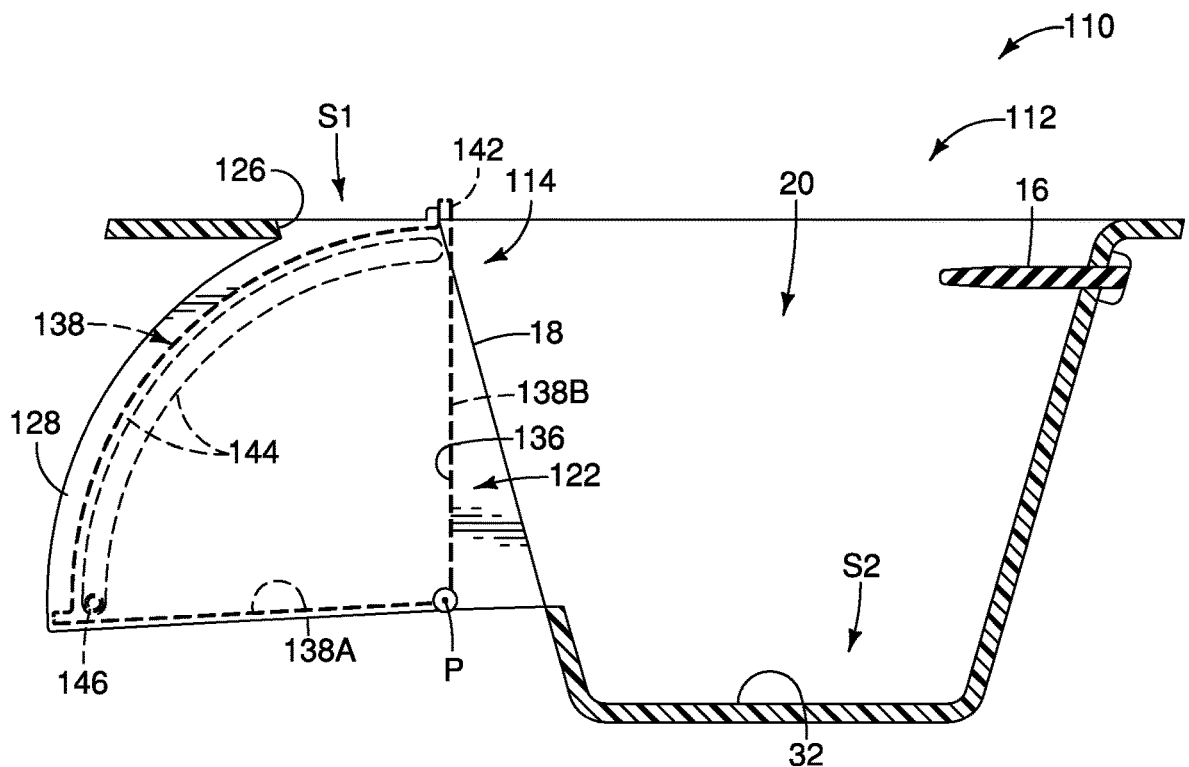
FIG. 5 is a cross-sectional view of a first modified vehicle holding unit similar to FIG. 3 with a first modified holding member in a stowed position.
Figure 6:
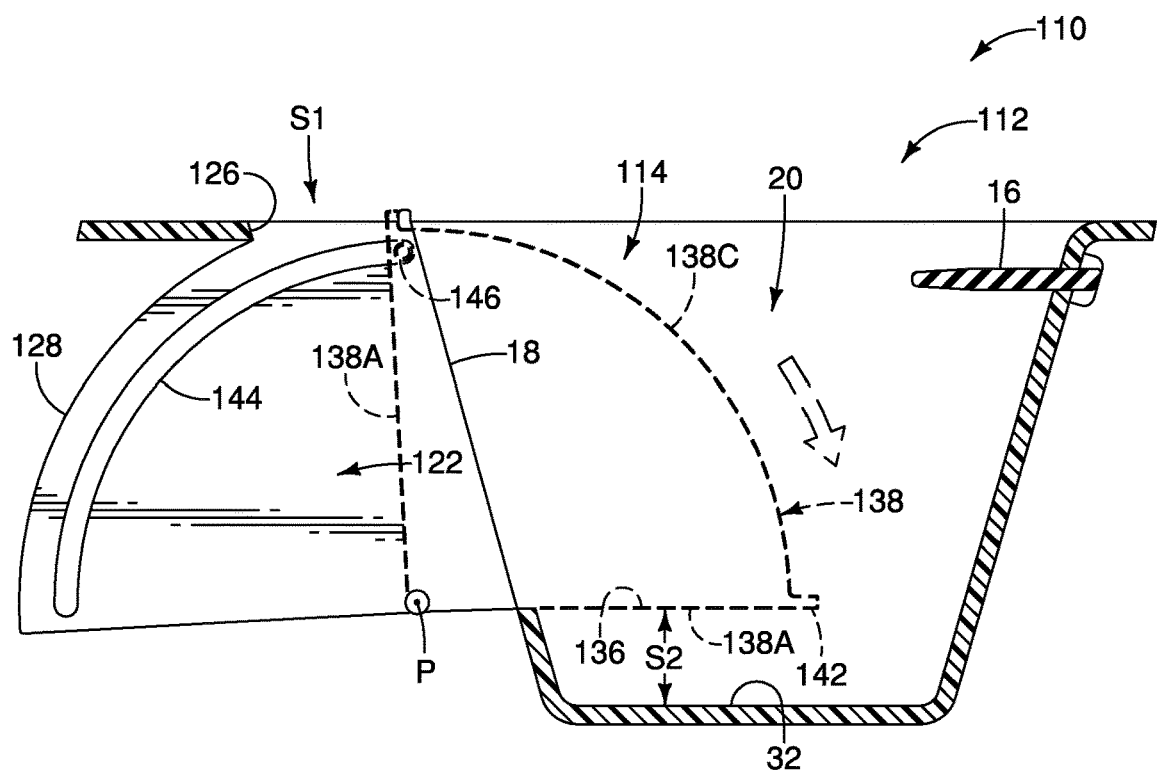
FIG. 6 is a cross-sectional view of the first modified vehicle holding unit similar to FIG. 6 with the first modified holding member in a deployed position.

Referring now to FIGS. 5 and 6, a modified vehicle holding unit 110 in accordance with a first modification will now be discussed. The vehicle holding unit 110 can be implemented to the center console C in the same way as the vehicle holding unit 10 of the first illustrated embodiment. For simplicity, only a portion of the modified vehicle holding unit 110 is illustrated to show the modifications from the vehicle holding unit 10. The vehicle holding unit 110 includes a modified cupholder 112 and a modified holding member 114. For simplicity and due to the similarity between the vehicle holding units 10 and 110, all components of the vehicle holding unit 110 that are identical to the vehicle holding unit 10 will receive the same reference numerals. All modified components of the vehicle holding unit 110 that correspond to the vehicle holding unit 10 will receive the same reference numeral plus 100.

The cupholder 112 includes a sidewall 18 that defines a cup receiving area 20. The cupholder 112 includes a modified recess 122 that receives the holding member 114 when the holding member 114 is in the stowed position. The recess 122 includes a pair of sidewalls 128 (only one shown for simplicity). The holding member 114 includes a pair of modified side supports 138 (only one shown for simplicity) and a base 36 connecting the side supports 138. As the side supports 138 are identical, only one side support 138 will be discussed. The side support 138 is wedge-shaped having first and second straight edges 138A and 138B and a curved edge 138C. The base 136 has a user contact portion 142 that protrudes from the side supports 138. The user contact portion 142 is configured to contact an abutment 134 of the cupholder 112 when the base 136 is in the stowed position. The holding member 114 moves between a stowed position and a deployed position in order to hold an external object similar to that as shown in FIG. 1 of the first illustrated embodiment.

The vehicle holding unit 110 of the first modification is basically identical to the cupholder 112 of the first illustrated embodiment, except that the recess 122 includes at least one groove 144 and the holding member 114 includes at least one protrusion 146 that is received in the at least one groove 144 of the recess 122. Preferably, each of the side supports 138 includes one protrusion 146 and each of the sidewalls 128 of the recess 122 includes one groove 144 that receives a corresponding protrusion 146 of the holding member 114. The holding member 114 slides along the grooves 144 of the recess 122 when the holding member 114 is moved between the stowed and the deployed positions.

Figure 7:
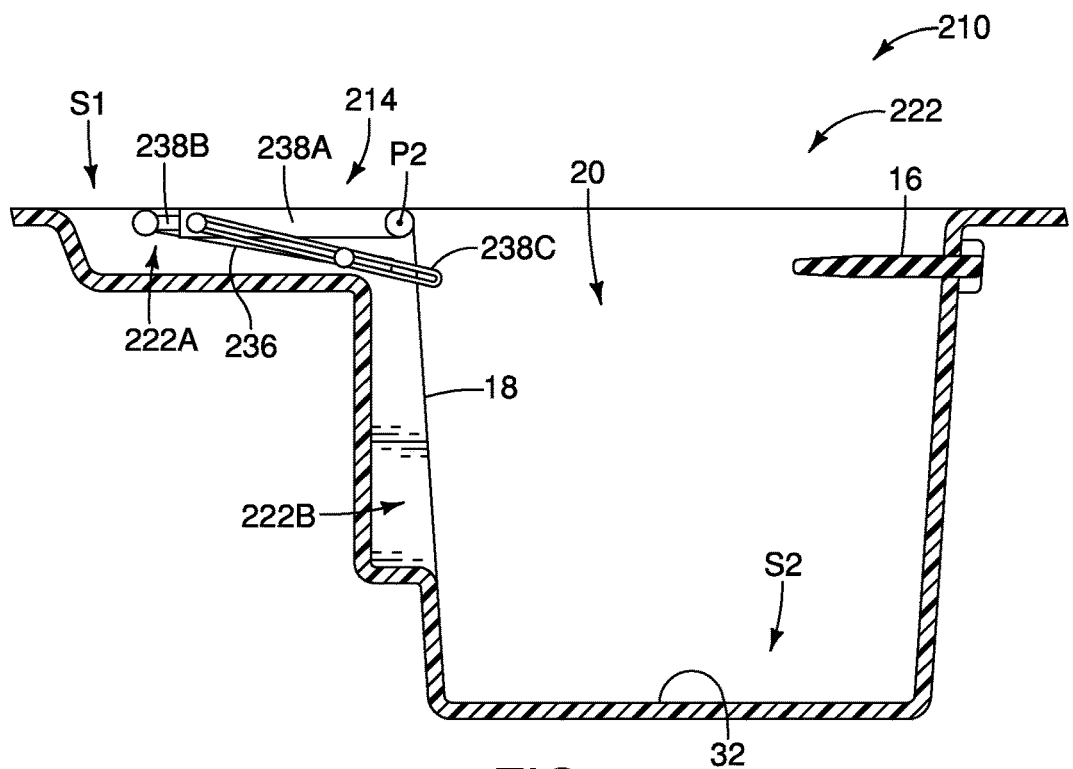
FIG. 7 is a cross-sectional view of a second modified vehicle holding unit similar to FIG. 3 with a second modified holding member in a stowed position.
Figure 8:
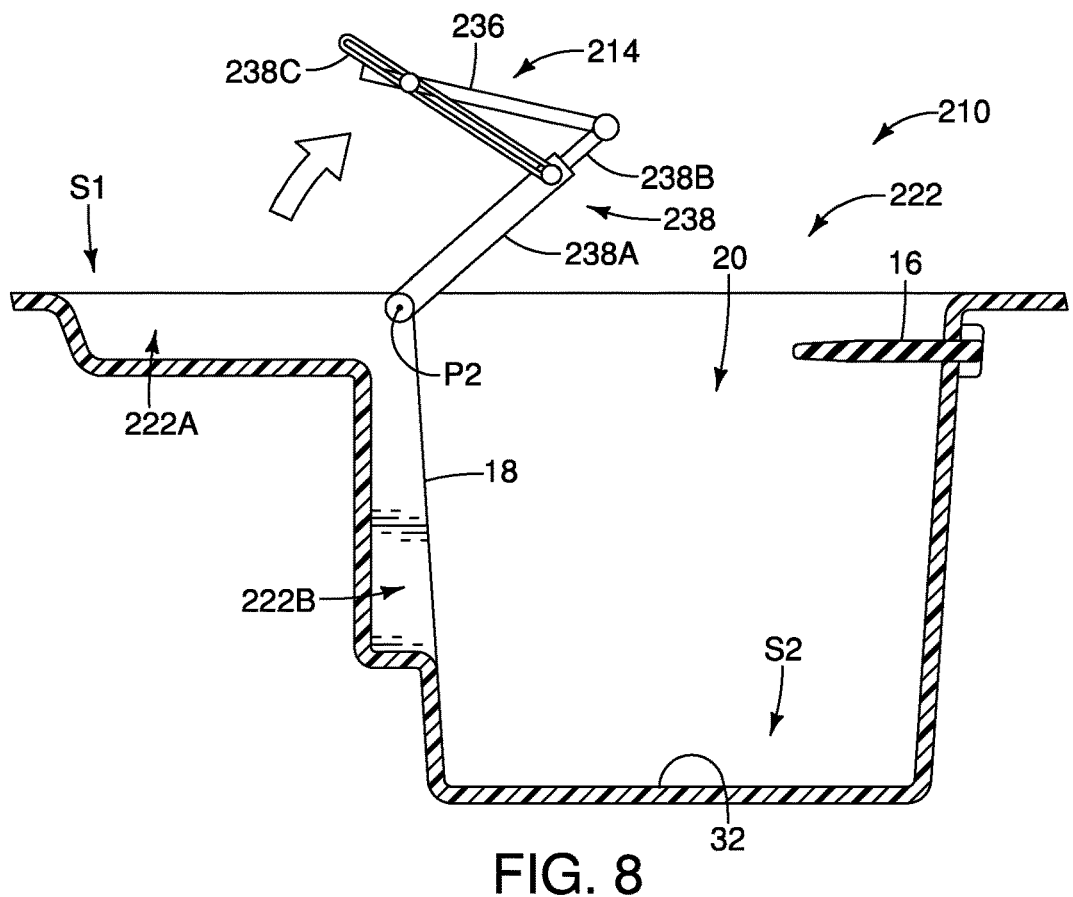
FIG. 8 is a cross-sectional view of the second modified vehicle holding unit similar to FIG. 7 with the second modified holding member being moved out of the stowed position.
Figure 9:
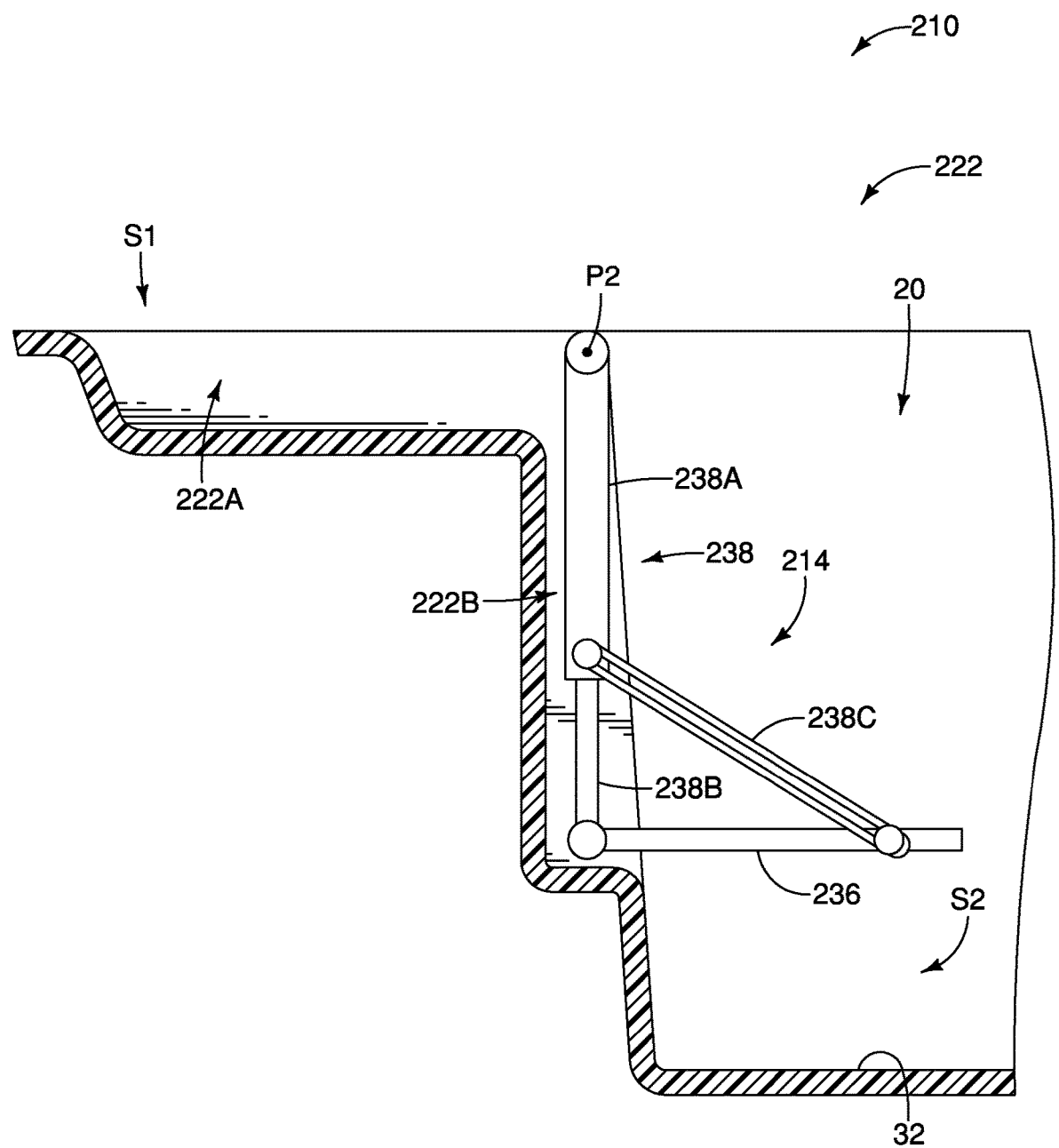
FIG. 9 is a cross-sectional view of the second modified vehicle holding unit similar to FIGS. 7 and 8 with the second modified holding member in the deployed position.

Referring now to FIGS. 7 to 9, a vehicle holding unit 210 in accordance with a second modification will now be discussed. The vehicle holding unit 210 can be implemented to the center console C in the same way as the vehicle holding unit 10 of the first illustrated embodiment. For simplicity, only a portion of the second modified vehicle holding unit 210 is illustrated to show the modifications from the vehicle holding unit 10.

The vehicle holding unit 210 includes a second modified cupholder 222 and a second modified holding member 214 that includes a modified base 236. The holding member 214 moves between a stowed position and a deployed position in order to hold an external object similar to the vehicle holding unit 10 of the first illustrated embodiment. For simplicity and due to the similarity between the vehicle holding units 10 and 210, all components of the vehicle holding unit 210 that are identical to the vehicle holding unit 10 will receive the same reference numerals. All modified components of the vehicle holding unit 210 that correspond to the vehicle holding unit 10 will receive the same reference numeral plus 200.

The cupholder 222 includes a sidewall 18 that defines a cup receiving area 20. The cupholder 222 of the second illustrated embodiment is basically identical to the cupholder 222 of the first illustrated embodiment, except that the cupholder 222 includes a first recess 222A and a second recess 222B. The first and second recesses 222A and 222B are in communication with each other. The first recess 222A extends mainly radially with respect to the sidewall 18. The second recess 222B that extends mainly vertically with respect to the sidewall 18. The holding member 214 is disposed in the first recess 222A when the holding member 214 is in the stowed position, as seen in FIG. 7. The holding member 214 is disposed in the second recess 222B and extends into the cup receiving area 20 when in the deployed position, as seen in FIG. 9. Thus, the base 236 is disposed in the first recess 222A when in the stowed position and the base 236 is disposed in the second recess 222B and the cup receiving area 20 when in the deployed position.

The first recess 222A includes a receiving opening defining a space S1 that enables user access of the holding member 214. The second recess 222B is an elongated recess that opens into the cup receiving area 20. As shown, the second recess 222B is spaced from a bottommost surface of the cupholder 222 for storage of small external objects (e.g., wires, chargers, etc.).

The holding member 214 further includes a pan of identical side supports 238 (only one shown for simplicity). The side supports 238 are coupled to opposite sides of the base 236 to define a pocket for holding the external object. Each of the pair side supports 238 includes a pair of telescopic tubes 238A and 238B (only one pair shown for simplicity) that extend and retract when the holding member 214 moves between the deployed and the stowed positions, as best seen in FIGS. 6 and 7. The side supports 238 further include a pair of connectors 238C (only one shown for simplicity) connecting the telescopic tubes 238A and 238B to the base 236.

The telescopic tubes 238A and 238B can be considered a pair of struts, including a top strut 238A and a bottom strut 238B. As best seen in FIGS. 8 and 9, the top strut 238A is pivotally connected to the sidewall 18 of the cupholder 222 in a conventional manner at a pivot point P2. The bottom strut 238B is pivotally connected to the base 236. The connector 238C extends between the top strut 238A and the base 236. The connector 238C includes an elongated groove for receiving a projection of the base 236. The projection of the base 236 moves along the groove as the holding member 214 moves between the stowed and deployed positions.

The base 236 receives the external object such that the external object is held in place by the base 236, the side supports 238 and the second recess 222B. The base 236 is spaced from an end wall of the first recess 222A by a space S1 when in the stowed position for easy user access of the base 236 to move the base 236 to the deployed position. The base 236 is preferably a plate made of a rigid member such as plastic or metal. The base 236 has a first end pivotally connected to the connector 238C in a conventional manner. The base 236 has a second end pivotally connected to the bottom strut 238B in a conventional manner. In the second modification, the base 236 is on one side of the sidewall 18 in the stowed position and being on another side of the sidewall 18 in the deployed position. As seen in FIG. 8, the holding member 214 is upwardly pivotable by the side supports 238 at the pivot point P2 to move from the stowed to the deployed position. Therefore, the base 236 is upwardly pivotable when moving from the stowed position to the deployed position. Thus, in the second modification, the base 236 is not radially movable when moving between the stowed and deployed positions. The base 236 is cantilevered with respect to the cupholder 222 in the deployed position.

In a further modification of the vehicle holding units 10, 110 and 210 of the above embodiments, a simple implementation of the claimed invention can be a vehicle holding unit comprising a cupholder having a sidewall defining a cup receiving area, a recess having a pair of sidewalls that define an opening in communication with the cup receiving area. The cupholder further has a holding member disposed in the recess in a stowed position and in the cup receiving area in a deployed position. The recess can be disposed directly across from a retention arm of the cupholder. The holding unit can include just a base that is movably attached to a bottom of the recess. For example, the holding unit can be hingedly or pivotally attached to the bottom of the recess to move between the stowed and deployed positions. The base can be stowed in the recess via a snap fit connection with the sidewalls of the recess. Alternatively, the base can be biased in the stowed position by a spring and held in place in the deployed position by holding an external object. The external object is secured by the sidewalls of the recess, the base and the retention arm.

GENERAL INTERPRETATION OF TERMS

In understanding the scope of the present invention, the term "comprising" and its derivatives, as used herein, are intended to be open ended terms that specify the presence of the stated features, elements, components, groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle holding unit. Accordingly, these terms, as utilized to describe the present invention should be interpreted relative to a vehicle equipped with the vehicle holding unit.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle holding unit comprising:
a cupholder having a sidewall defining a cup receiving area; and
a holding member having a base movable between a stowed position and a deployed position, the base being mainly vertical in the stowed position and the base being mainly horizontal and extending into the cup receiving area in the deployed position, the base moving between one side of the sidewall and another side of the sidewall into the cup receiving area when moving from the stowed position to the deployed position, the cupholder including a recess extending from the cup receiving area and being in open communication with the cup receiving area at a top rim of the side wall, the holding member being disposed in the recess in the stowed position.

2. The vehicle holding unit according to claim 1, wherein the base is not circumferentially movable with respect to the sidewall when moving between the stowed and deployed positions.

3. The vehicle holding unit according to claim 1, further comprising a retention arm extending from the sidewall substantially across from the base when the base is in the deployed position.

4. The vehicle holding unit according to claim 1, wherein the base is cantilevered with respect to the cupholder in the deployed position.

5. The vehicle holding unit according to claim 1, wherein the holding member further includes a pair of side supports coupled to opposite sides of the base to define a pocket for holding an external object.

6. The vehicle holding unit according to claim 5, wherein each of the pair side supports includes a pair telescopic tubes that extend and retract between the deployed and the stowed state.

7. The vehicle holding unit according to claim 1, wherein the cupholder includes a recess extending from the cup receiving area and the holding member is disposed in the recess in the stowed position.

8. The vehicle holding unit according to claim 1, wherein the holding member further includes a pair of side supports coupled to opposite sides of the base.

9. The vehicle holding unit according to claim 8, wherein the holding member is pivotally coupled to the recess.

10. The vehicle holding unit according to claim 8, wherein the side panels, the base and the end wall of the recess define a pocket for holding an external object when the base is in the deployed position.

11. The vehicle holding unit according to claim 8, wherein the side panels and the base are a one-piece unitary member.

12. The vehicle holding unit according to claim 8, wherein at least one of the side supports includes a projection, the projection abutting the sidewall of the cupholder when the base is in the deployed position.

13. The vehicle holding unit according to claim 8, wherein the side panels are slidable with respect to the recess.

14. The vehicle holding unit according to claim 1, wherein the cupholder includes a first recess that extends mainly radially with respect to the sidewall and a second recess that extends mainly vertically with respect to the sidewall.

15. The vehicle holding unit according to claim 14, wherein
the second recess is spaced from a bottommost surface of the cupholder.

16. The vehicle holding unit according to claim 14, wherein
the first and second recesses are in communication with each other.

17. The vehicle holding unit according to claim 14, wherein
the base is disposed in the first recess when in the stowed position and the base is disposed in the second recess when in the deployed position.

18. The vehicle holding unit according to claim 14, wherein
the base is spaced from an end wall of the first recess.

19. The vehicle holding unit according to claim 14, wherein
the base is upwardly pivotable when moving from the stowed position to the deployed position.

* * * * *